Aug. 12, 1958
G. A. MARCHAND
2,847,520
DAMPED MICROPHONE
Filed July 26, 1954
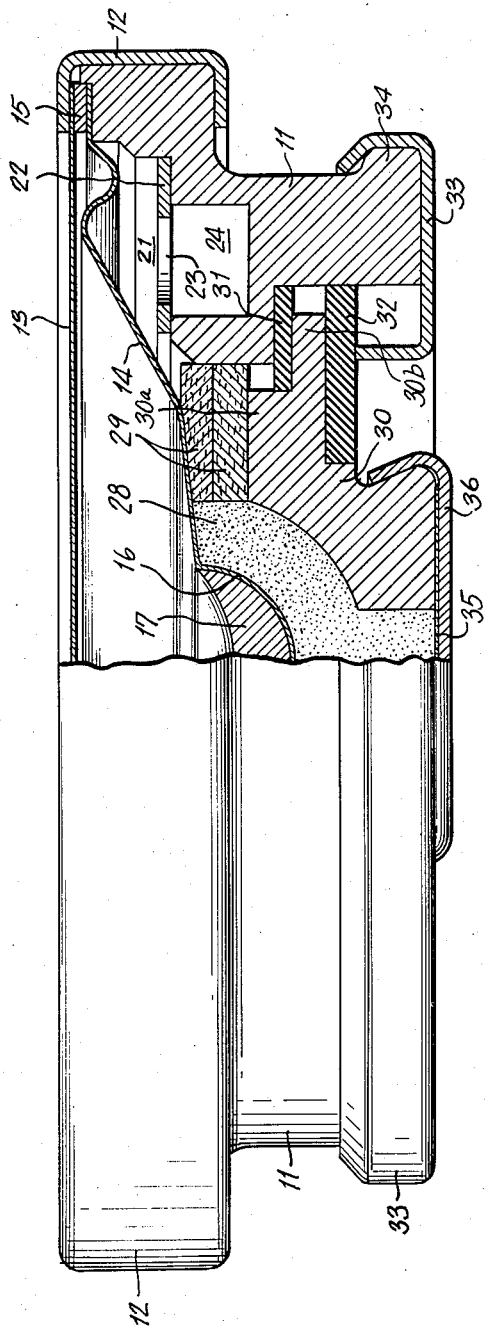
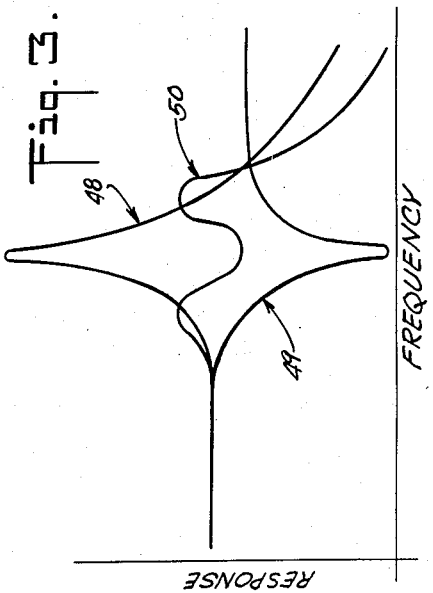
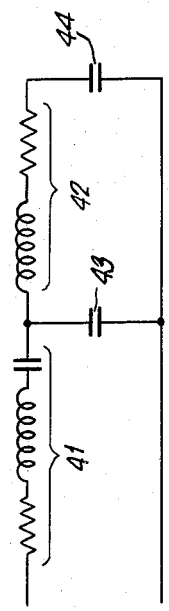
INVENTOR.
GASTON A. MARCHAND
BY
Robert P. Dunham
ATTORNEY ns # United States Patent Office 2,847,520
Patented Aug. 12, 1958

2,847,520

DAMPED MICROPHONE

Gaston A. Marchand, New York, N. Y., assignor to Roanwell Corporation, Brooklyn, N. Y., a corporation of New York Application July 26, 1954, Serial No. 445,811

2 Claims. (Cl. 179—180)

This invention is concerned with a sound translating device in general and more specifically with a microphone.

Although the principles involved may be applied to other types of microphones, the microphone that is illustrated is of the type generally known as a carbon-button microphone. This type of microphone is well known and employs a carbon pile that is variably compressed by the action of a diaphragm which is subject to the sound waves impinging thereon. Such variable compression creates a corresponding variation in the electrical resistance of the carbon pile. This resistance variation is employed in a well known manner to control an electric circuit whereby the sound waves are translated into corresponding variations in the amplitude of a direct current.

In sound translating devices generally, the problem presented is one involving the endeavor to attain a particular response characteristic that may be expressed in terms of a curve involving response plotted against frequency. This curve should ideally have a flat portion over the entire useful range of frequencies. Some of the approaches employed heretofore in endeavoring to attain such results have involved among others such methods as that of stretching the diaphragm employed to a taut condition such that its inherent resonant frequency will be kept above the usable range of frequencies. Another approach has been to damp the diaphragm very heavily in order to iron out the effects of any natural resonance frequencies. Either of the above methods involve the substantial drawback that they act to cut down the sensitivity of the device to an undesirable extent.

Another approach to the problem that has been employed has been that of using a very thin diaphragm and employing some means of acoustic damping in order to counteract the natural resonance of the diaphragm. This would be relatively successful were it not for the fact that in the mass production of diaphragms having the required thinness, variations in the gauge or thickness of the diaphragms are bound to occur. Such variations may occur, in significant magnitude, between different parts of the same diaphragm, and also from one diaphragm to another. Such variations in thickness or in the contour of diaphragms are accompanied by corresponding variations in the resonant frequency of the diaphragms. Such unavoidable variations in thickness of the diaphragms as they are produced may result in substantial variations in resonant frequency from one diaphragm to another. Therefore, mass production of microphones having such thin diaphragms has been difficult because each microphone has had to have its acoustic damping means individually tailored to the diaphragm employed. This being the case, the techniques of mass production have been impeded since each unit has been made or altered to accommodate its individual diaphragm.

The difficulties set forth above may be overcome by this invention wherein a very thin diaphragm is used and a substantial load having a sizeable mass is attached to each diaphragm for vibration therewith. The load is localized on the diaphragm, preferably at its center, and the mass of the load is made slightly greater than the effective mass of the thin diaphragm so that the variations in the mass of the diaphragms (which occur in the course of normal production of such diaphragms) will have a minimal effect on the frequency response characteristic of the diaphragm and its added load. Consequently the frequency response characteristic of the diaphragm unit (including the additional heavy load attached) may be maintained constant, to a satisfactory degree of accuracy, from one unit to the next. However, the use of this localized load introduces in the frequency response characteristic a resonant effect such that the amplitude of response is increased at a certain frequency or range of frequencies. Consequently, with such a diaphragm unit, by itself, the desired flat response characteristic is not attained. To counteract that condition, the diaphragm unit is provided with acoustical damping means designed to counteract the particular resonant frequency or frequencies so that the overall response will be a flat curve as desired.

Therefore it is an object of this invention to provide a highly sensitive sound translating device that has a flat response characteristic curve.

Another object of this invention is to provide a simple, rugged microphone that has superior excellence in its response characteristics while at the same time being adapted to be mass produced and yet maintain a high uniformity of excellence.

Briefly, this invention concerns a sound translating device for use with a predetermined range of frequencies that comprises a relatively thin diaphragm and a localized load having a mass slightly greater than the effective mass of the diaphragm and attached to said diaphragm for vibration therewith. The load is effective to maintain the frequency response characteristic of the diaphragm unit substantially unchanged by variations in the thickness of said diaphragm of the magnitude encountered in common manufacturing processes. The combined diaphragm and load has a resonant frequency lying within the predetermined range of frequencies, and the device further includes anti-resonant means associated with the diaphragm for opposing the resonance effects of said combined diaphragm and load, in order to produce a flat response curve for the complete device over the predetermined range of frequencies.

A specific microphone in accordance with this invention is described in detail below and shown in the drawings, wherein—

Fig. 1 is a side elevation partly broken away to give a cross-section through the axis of the microphone;

Fig. 2 is an electrical equivalent circuit diagram illustrating the equivalent circuit for the acoustical arrangement involved; and Fig. 3 is a curve showing the response plotted against the frequency for a typical microphone according to this invention, and for individual components thereof.

A major aspect of this invention lies in the ability to maintain a very high degree of excellence in the response characteristics of each microphone of a large number, even though the diaphragms employed are mass produced and consequently may vary from one to another to a substantial degree as to their frequency response characteristics. In order to accomplish this the technique employed involves first of all the use of a diaphragm unit comprising a thin diaphragm and a substantial localized load attached thereto, such that the frequency response characteristic of the diaphragm unit is varied only to a negligible degree by the variations that occur between individual diaphragms as they are supplied from mass production techniques. The result of using this additional mass, however, is to create a diaphragm unit that has a natural resonance frequency lying within the usable range of frequencies for the microphone. In order to eliminate this resonance condition, there is employed an acoustical anti-resonant unit that is designed to have its maximum damping at the same frequency or frequencies as the resonance of the diaphragm unit. By proper design of the load and of the anti-resonant unit, the resonance introduced by the load may be directly and entirely counterbalanced so that the response characteristic curve for the microphone is desirably flat over the whole predetermined range of frequencies involved.

Referring to Fig. 1, there is illustrated a carbon-button microphone according to this invention that has a body member or frame 11 which may be constructed of a conducting material such as aluminum or the like. The body member 11 is annular and has around its maximum diameter a clamp 12 which is pressed over the edges of the maximum diameter portion of the body 11 and holds securely in place an outer protective membrane 13 and a thin diaphragm 14. The membrane 13 may be made of any moisture proof material, e. g. rubberized silk, and has a negligible effect on the acoustical frequency response or other acoustical characteristics of the microphone. The membrane 13 and diaphragm 14 are spaced apart by means of a washer 15. The diaphragm 14 has a concave section 16 at the center thereof and carries within the hollow thus formed a substantial load 17 of solder or the like, that is securely attached to the diaphragm 14 at the concave section 16 in order to vibrate integrally with the diaphragm 14. The mass or weight of the solder 17 is accurately measured to obtain a predetermined quantity in order that variations in the gauge or thickness of the diaphragm 14 will not produce any substantial change in the frequency response characteristic of the diaphragm unit which includes both the diaphragm 14 and the load 17.

Located beneath the diaphragm 14 (as viewed in Fig. 1) near the periphery thereof, there is an annular chamber 21 defined on its inner and upper sides by diaphragm 14, on its outer side by body member 11, and on its lower side by a washer 22 that may be constructed of any desirable material and that is fastened, e. g. cemented, in place on the body member 11. A lower annular chamber 24 is defined by an annular groove formed in body member 11 and covered by washer 22. In this washer 22 there is at least one hole 23 that communicates with the lower annular chamber 24.

The relative dimensions of the upper chamber 21, the lower chamber 24 and the communicating hole or holes 23 are so designed that the acoustical anti-resonant effect created thereby opposes and balances the resonant effects observed in the frequency response characteristic of the diaphragm unit including diaphragm 14 and load 17.

Beneath the diaphragm 14 and its central concave section 16 there is a carbon pile 28 that is bounded near the top thereof by a pair of washers 29 which may be constructed of any resilient electrically insulating material, e. g. felt in one instance and cotton wadding in the other. Bounding the lower portion of the carbon pile 28 there is an annular electrode 30 having a smaller diameter than body member 11 so as to fit inside thereof. Electrode 30 may be constructed of any electrically conducting material such as gold plated brass or the like. Surrounding the electrode 30 and fitting over an upper reduced diameter portion 30a, there is a centering washer 31 which may be constructed of any satisfactory insulating material such as hard rubber or the like. Below the washer 31 and spaced therefrom by a flange 30b on electrode 30 there is a spacing washer 32 which likewise may be constructed of any satisfactory insulating material, e. g. fiber, hard rubber or Bakelite. To hold the electrode 30 in place on the unit, there is a clamping ring 33 that is pressed into place over a lower annular rim 34 of the member 11. The inner edge of clamp 33 stands vertically against the spacing washer 32 to hold the electrode 30 firmly in place.

Beneath the lowest portion of the carbon pile 28 there is a gasket 35 that is held in place by means of a cap 36 which is pressed on over the lower, downwardly divergent rim of the electrode 30.

In use, the microphone has two electrodes, one of which is electrode 30 and the other of which may be the body member 11 or any convenient electric circuit-making element that employs the diaphragm 14 as part of the circuit. Circuit-making terminals or lugs (not shown) may be soldered in place or otherwise attached to the electrodes 30 and 11 in any convenient manner.

The operation of a carbon-button type of microphone is well known, and it is merely pointed out that the resistance circuit including the carbon pile 28 may be traced as follows: Beginning at body member 11 as one electrode and thence through the diaphragm 14, that is constructed of a good electrical conductor such as Phosphor bronze or the like, and is in contact with the upper portion of the carbon pile 28 and acts to variably compress the carbon pile upon the pressure from sound waves as received by the diaphragm 14. Then from the diaphragm 14, where it is in contact with carbon pile 28, through the variably compressible carbon granules of the carbon pile 28 to the conducting material electrode 30 as the other electrode of the microphone.

To clarify the operation of the acoustical anti-resonant chambers, reference may be had to Fig. 2 where an equivalent electrical circuit is illustrated and wherein the series group of resistor, coil and condenser 41 represent the electrical equivalent of the diaphragm 14, and the series coil and resistor 42 represent the hole or passage 23 between the two acoustical chambers. Furthermore, the condenser 43 of Fig. 2 represents the cavity 21 of the microphone and the condenser 44 of Fig. 2 represents the cavity 24 of the microphone. It will be clear now that the circuit illustrated in Fig. 2 shows an equivalent electrical circuit that will act electrically (when an alternating current potential is applied) in the same manner as the cavities 21, 24, and their connecting passage 23 will act acoustically, when the diaphragm 14 is vibrated by sound waves and subjects the cavities to varying pressure impulses.

It is to be noted that the load 17 need not necessarily be located at the center of the diaphragm. However, it is preferable to have it located there, especially with the construction illustrated.

It will be understood by anyone skilled in the art that the diaphragm 14 and its attached load 17 will have a natural resonance frequency. Therefore as sounds of varying frequency but constant intensity impinge upon the unit, the response by way of vibration amplitude will increase to a maximum at such resonant frequency. It is well known that two air chambers having a restricted passage connecting them together, will act to create an anti-resonant effect at a certain frequency of compression of the air in one chamber. Therefore, as sounds of varying frequency but constant intensity act upon one of the chambers viz. 21, the response by way of compression (or vibration) amplitudes will decrease to a minimum at such anti-resonant frequency. By choosing proper dimensions for the chambers 21 and 24 and for the passage 23 connecting them, the anti-resonant frequency (or point of minimum response) may be made to equal the natural resonant frequency of the diaphragm 14 and the load 17 so as to cancel out the increased response of the diaphragm and load with the result that a straight line response curve will result.

The same action and reaction with regard to the diaphragm having a resonant frequency and the cavities having an anti-resonant acoustical effect may be explained with reference to Fig. 3 where the response (i. e., travel of diaphragm 14 or variation in resistance of carbon button 28) of the microphone and of some of its components, are plotted against the frequency of the sound impinging thereon. The resonant curve 48 illustrates the variation of response with frequency in the case of the diaphragm unit (diaphragm 14 and load 17) vibrating alone, i. e. without the cavities 21 and 24. A lower anti-resonant curve 49 illustrates the effect of cavities 21, 24 and the connecting passage 23 associated with an imaginary non-resonant diaphragm which set up a damping effect which varies oppositely to the resonant effect of the resonant curve 48. Consequently, the overall effect is the algebraic sum of curves 48 and 49 which produces a relatively flat curve 50 that gives the desirable characteristic of a flat response curve for the entire useful range of frequencies for the microphone. Theoretically, the result of matching the resonance curve of the diaphragm 14 with the anti-resonance curve of the cavities 21, 24 and passage 23, would produce two resonances (not shown) one above and one below the resonance frequency of the diaphragm 14 and load 17 with an anti-resonance between. However, in practice, the resistance factors involved in the holes and in the diaphragm will damp out these resonances and a satisfactorily flat curve will be had.

A specific example of the diaphragm dimensions that may be employed are as follows: The diaphragm 14 is Phosphor bronze having a thickness of 0.002 inch with a tolerance of as much as 0.0003 inch plus or minus. The average weight of the diaphragms employed having this thickness is 0.392 gram. The effective mass of the moving material in a functioning diaphragm is estimated to be two-thirds of the weight of the diaphragm or 0.262 gram. The weight of the solder load 17 is measured exactly and is maintained at 0.280 gram. As a result the mass of the diaphragm 14 alone may vary as much as fifteen percent while the mass of the unit including diaphragm 14 and load 17 cannot vary more than eight and seven-tenths percent. Consequently, the chambers 21 and 24 and passage 23 may be designed to counteract an average natural resonance maximum that will not vary unduly from one diaphragm to the next.

While there has been set forth a specific illustration according to the applicable statutes, this is not to be taken as in any way limiting the invention but merely as being descriptive thereof.

It is claimed:

1. A microphone comprising a rigid body member of generally annular contour and having in one side an annular channel open toward said one side, a diaphragm unit including a thin circular diaphragm having a concave central portion and a load of solder localized in said central portion, said load having a mass slightly greater than the effective mass of the diaphragm and at least partially filling said central portion, said diaphragm unit having a frequency responce characteristic which is generally flat throughout the range of audible frequencies, except for a resonant frequency within that range and which is determined by said load independently of manufacturing variations in the mass of the diaphragm, an annular disc of rigid material fastened to said body member and covering said open channel, said body member and said disc cooperating to define an annular chamber of fixed volume, said disc having at least one opening therein providing communication with said chamber, and means including said disc, said diaphragm, and said body member, and defining a variable volume annular chamber communicating with said fixed volume chamber through said aperture, said chambers and said aperture cooperating to dampen the vibrations of said diaphragm unit at said resonant frequency, so that the frequency response characteristic of the microphone is substantially flat throughout the audible range.

2. A microphone as defined in claim 1, comprising a rigid electrode member insulatingly mounted within said annular body member at the side thereof opposite said diaphragm, a carbon pile between said diaphragm and said electrode member, and resilient washer means extending around the periphery of the carbon pile between said electrode member and said diaphragm, said resilient washer means forming a part of said variable volume chamber defining means.

References Cited in the file of this patent

UNITED STATES PATENTS

| 1,540,585 | Abbott | June 2, 1924 |
| 2,340,777 | Stanley | Feb. 1, 1944 |
| 2,540,498 | Tallman | Feb. 6, 1951 |
| 2,567,368 | Eckardt | Sept. 11, 1951 |

FOREIGN PATENTS

| 513,160 | Great Britain | Oct. 5, 1939 |